(12) United States Patent
Wright et al.

(10) Patent No.: US 6,704,297 B1
(45) Date of Patent: Mar. 9, 2004

(54) DOWNLINK ORDERWIRE INTEGRATOR AND SEPARATOR FOR USE IN A SATELLITE BASED COMMUNICATIONS SYSTEM

(75) Inventors: David A. Wright, Hermosa Beach, CA (US); Stuart T. Linsky, Rancho Palos Verdes, CA (US); Gregory S. Caso, Hermosa Beach, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 653 days.

(21) Appl. No.: 09/644,588

(22) Filed: Aug. 23, 2000

(51) Int. Cl.$^7$ .................................................. H04B 7/00
(52) U.S. Cl. ................... 370/310.1; 370/323; 370/325; 370/316; 370/349; 370/522
(58) Field of Search ................................. 370/310, 326, 370/349, 468, 494, 323, 325, 396, 522, 316

(56) References Cited

U.S. PATENT DOCUMENTS

| | | | |
|---|---|---|---|
| 5,392,450 A | * | 2/1995 | Nossen ........................ 455/12.1 |
| 6,272,109 B1 | * | 8/2001 | Pei et al. ..................... 370/230 |
| 6,366,761 B1 | * | 4/2002 | Montpetit ..................... 455/12.1 |
| 6,549,530 B1 | * | 4/2003 | Cable et al. ................. 370/347 |
| 6,580,716 B1 | * | 6/2003 | Falk et al. .................. 370/396 |
| 6,597,669 B1 | * | 7/2003 | Takahashi et al. ........... 370/325 |

OTHER PUBLICATIONS

Robert W. Chang, "Synthesis of Band-Limited Orthogonal Signals for Multichannel Data Transmission", 1966, pp. 1775–1796.
David McDysan and Darren Spohn, "ATM Theory and Applications", pp. 299–306, 330–336, and 791–818.

\* cited by examiner

Primary Examiner—Wellington Chin
Assistant Examiner—John Shew
(74) Attorney, Agent, or Firm—Harness, Dickey & Pierce, P.L.C.

(57) ABSTRACT

A downlink orderwire integrator (63) and separator (81) for use in a processing satellite (12) and a user terminal (14) in a satellite based communications system (10) is provided having a formatter (64), a cell switch (72) and a cell sieve (80). The formatter (64) generates orderwire cells (54) with each orderwire cell (54) having a header (60) and a body (62). The cell switch (72) receives the orderwire cells (54) from the formatter (64) and traffic cells (56) from at least one uplink (16) and arranges the orderwire cells (54) and the traffic cells (52) in at least one frame (48) to transmit on at least one downlink (18). The frame (48) includes a fixed custom frame portion (42) and a fixed traffic portion (50) that contains both the traffic cells (52) and the orderwire cells (54). The cell sieve (80) receives at least one frame (48) from the at least one downlink (18) and separates the traffic cells (52) and the orderwire cells (54) from the traffic portion (50), such that the formatter (64) and cell switch (72) are positioned within the processing satellite (12) and the cell sieve (80) is positioned within the user terminal (14).

18 Claims, 4 Drawing Sheets

DOWNLINK ORDERWIRE INTEGRATOR AND SEPARATOR FOR USE IN A SATELLITE BASED COMMUNICATIONS SYSTEM

BACKGROUND OF THE INVENTION

1. Field of the Invention

This invention relates generally to a communications system and, more particularly, to a downlink order wire integrator and separator for use in a processing satellite and user terminal employed in a satellite based communications system.

2. Discussion of the Related Art

In a satellite based communications system, a central terrestrial control processor or network control center (NCC) generally controls one or more processing satellites operating within the communications system. Each processing satellite within the communications system services multiple users or terminals located in multiple geographic areas, known as ground cells. The processing satellites receive and transmit data signals to and from the multiple users or terrestrial terminals positioned at different locations within the ground cells on a point-to-point manner, via uplinks and downlinks.

Transmission access to the uplinks in each ground cell is typically divided into sub-bands using frequency division multiple access (FDMA). Within each sub-band, the sub-band may again be divided by frequency into multiple channels using FDMA. Transmission access is also divided by time using time division multiple access (TDMA) into slots occupied by the transmission burst. On the downlinks, each ground cell typically operates on a single carrier frequency or channel, which is generally always on. This channel is also divided by time using TDMA.

Typically the data flow in a downlink in a particular ground cell for a satellite based communications system is arranged into three (3) parts. These parts include essential frame controls (operations, administration and maintenance (OA&M) functions for transferring the remaining portion of the frame), a separate fixed orderwire portion and a traffic or data portion. The essential OA&M functions generally include the synchronization fields for delineation of the frame and control directives which must be established in order to process the frame, such as the decoding technique or type. Additionally, this portion of the frame also generally identifies the beginning of the frame, the length and the frame number. The fixed space for orderwire information which includes other OA&M traffic generally includes synchronization feedback information, power control information, assignment of time slots and channels for transmitting data, authorization information, billing and other housekeeping information known in the art. The remaining portion of the frame includes many traffic or data cells that may be formed as asynchronous transfer mode (ATM) cells that actually carry the desired communication or information data.

For example, in the terrestrial SONET transmission system, this terrestrial system sets aside a 27 byte fixed orderwire overhead space or ⅓₀th of the frame total in every frame for conveyance of OA&M orderwire traffic in this fixed format. Existing satellite communications systems also follow this structure of providing a fixed or distinct orderwire portion of the frame to carry OA&M traffic separate from the payload traffic. While this structure or approach has been used for many years, it is relatively inefficient and inflexible when handling and managing OA&M traffic because of the fixed allocation in the downlink frame assigned to the OA&M process, much of which may be wasted when there is little OA&M traffic. In other words, by providing or allocating a fixed portion of the frame for OA&M traffic, should there be little or no OA&M traffic, the bandwidth for communication and information data may be unnecessarily limited based upon this fixed allocation.

What is needed then is a downlink orderwire integrator and separator for use in a processing satellite and a user terminal in a satellite based communication system. This will, in turn, provide a more efficient use of the overall frame or bandwidth, eliminate a fixed orderwire structure, provide an adaptive approach for transferring OA&M information which is not constrained by a fixed frame allocation, and enable more communication or information data to be transferred when there is little or no OA&M traffic. It is, therefore, an object of the present invention to provide such a downlink orderwire integrator and separator for a processing satellite and user terminal in a satellite based communications system.

SUMMARY OF THE INVENTION

In accordance with the teachings of the present invention, a downlink orderwire integrator and separator for use in a processing satellite and a user terminal in a satellite based communications system is provided. The downlink orderwire integrator and separator is operable to provide a versatile and efficient mechanism for transferring orderwire information or cells in a dynamic fashion. In other words, varying number of orderwire cells may be transferred per frame in a downlink as opposed to providing a fixed dedicated portion of a frame for orderwire information which may reduce the overall bandwidth capability.

In one preferred embodiment, a downlink orderwire integrator for use in a processing satellite in a satellite based communications system includes a formatter and a cell switch. The formatter generates orderwire cells with each orderwire cell having a header and a body. The cell switch receives the orderwire cells from the formatter and traffic cells from at least one uplink. The cell switch further arranges the orderwire cells and the traffic cells in at least one frame to transmit on at least one downlink, where the frame includes a fixed control frame portion and a traffic portion that contains both the traffic cells and the orderwire cells.

In another preferred embodiment, a downlink orderwire integrator and separator for use in a processing satellite and a user terminal in a satellite based communications system include a formatter, a cell switch, and a cell sieve. The formatter generates orderwire cells with each orderwire cell having a header and a body. The cell switch receives the orderwire cells from the formatter and traffic cells from at least one uplink and arranges the orderwire cells and the traffic cells in at least one frame to transmit on at least one downlink. The frame includes a fixed frame portion and a traffic portion that contains both the traffic cells and the orderwire cells. The cell sieve receives the at least one frame from the at least one downlink and separates the traffic cells and the orderwire cells from the traffic portion, such that the formatter and cell switch are positioned within the processing satellite and the cell sieve is positioned within the user terminal.

Use of the present invention provides a downlink orderwire integrator and separator for use in a processing satellite and a user terminal of a satellite based communications system. As a result, the aforementioned disadvantages associated with conventional frame allocations in a satellite based communications system have been substantially reduced or eliminated.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENTS

The following discussion of the preferred embodiment concerning a downlink orderwire integrator and separator for a processing satellite and user terminal in a satellite based communications system is merely exemplary in nature, and is in no way intended to limit the invention or its applications or uses.

Figure 1:
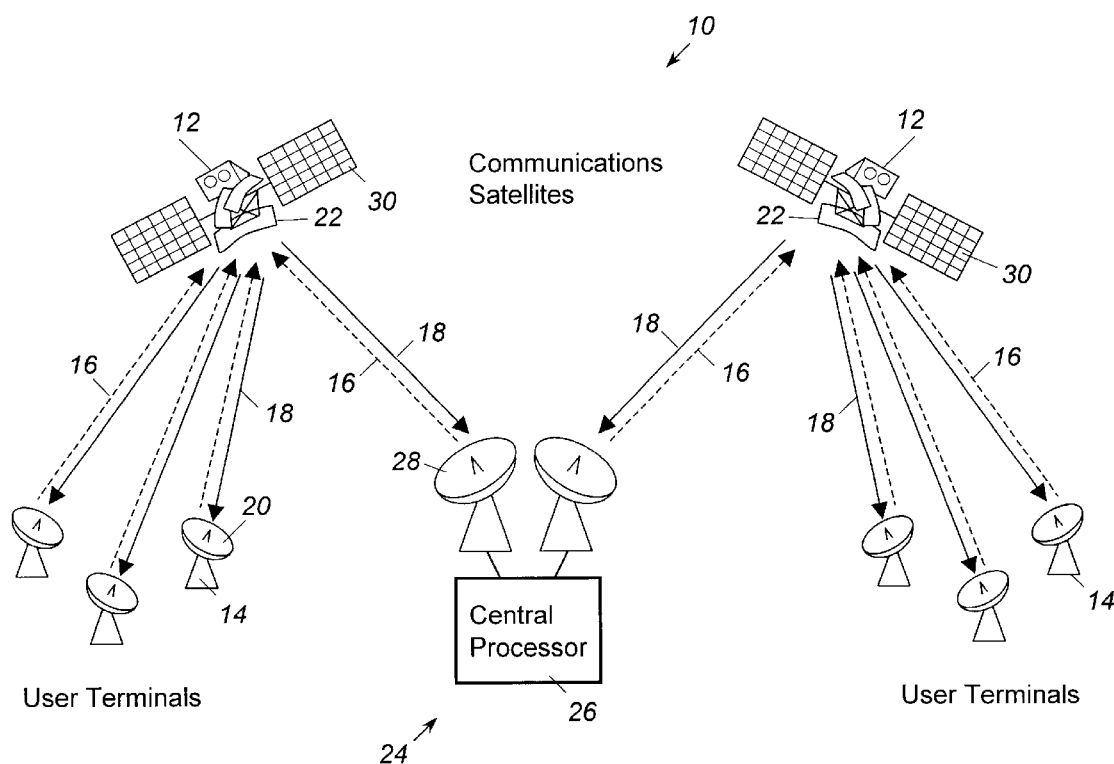
FIG. 1 is an overall satellite based cellular communications system block diagram.

Referring to FIG. 1, a satellite based cellular communications system 10 for supporting multiple users located in multiple geographic areas or ground cells is shown. The communications system 10 includes one or more processing satellites 12 operating generally in geosynchronous orbits. Each processing satellite 12 supports multiple terrestrial user terminals 14 positioned within various defined ground cells, further discussed herein. Each processing satellite 12 receives data signals from the user terminals 14 on the communications uplinks 16 and transmits data signals to the user terminals 14 on the communications downlinks 18. Each user terminal 14 transmits data signals on the communications uplinks 16, which may include multiple carrier channels and formats, and receives data signals on the communications downlinks 18, via an antenna 20. Each processing satellite 12 receives and transmits the data signals on the communications uplinks 16 and the communications downlinks 18, via a multibeam antenna 22 or any other appropriate antenna to service the required region.

The satellite based cellular communications system 10 also includes a network control center (NCC) 24 which includes a central control processor 26. The network control center 24 generally controls the overall operations of each processing satellite 12 utilizing communications uplinks 16 and communications downlinks 18, via an antenna 28. These overall operations include maintenance of the geosynchronous orbit, positioning of solar collectors 30, initializing satellite system parameters, user billing, as well as other operational orderwire controls which are all well known in the art. The central control processor 26 in the network operations center 24 is preferably a general purpose programmable computer such as a Sun Microsystems Computer or any other appropriate computer depending on the computational power required.

Figure 2:
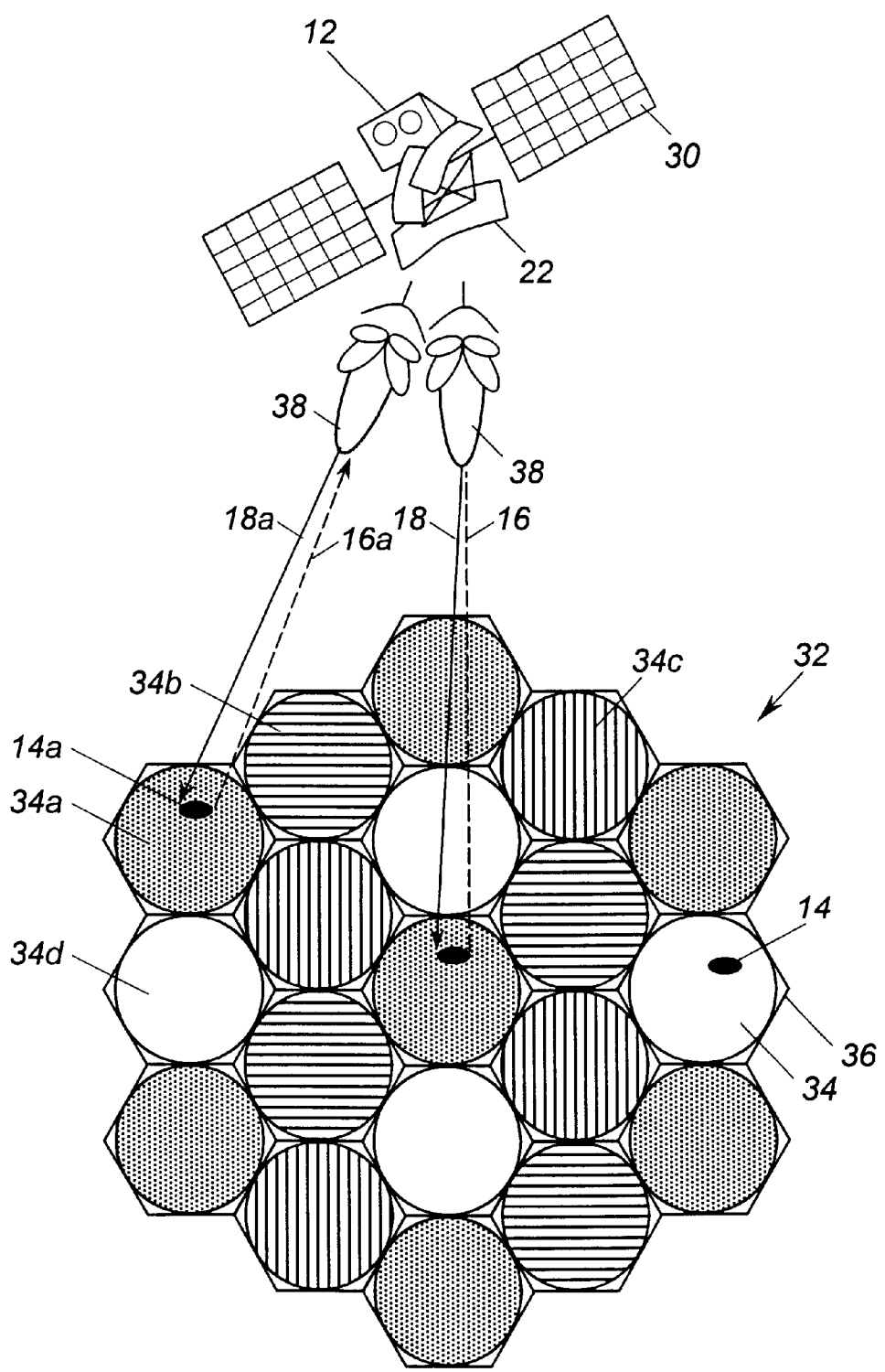
FIG. 2 is a detailed block diagram of communications uplinks and downlinks between terrestrial user terminals located within multiple ground cells and a processing communications satellite.

Referring now to FIG. 2, a processing communications satellite 12 is shown illuminating a coverage region 32, via antenna 22. The processing satellite 12 services the coverage region 32 which includes multiple ground cells 34 represented by each circular region. Each of the ground cells 34 is shown positioned within a hexagonal shaped region 36 that corresponds to the region individually illuminated by one antenna beam from the multibeam antenna 22 on the communications satellite 12. Each ground cell 34 typically measures approximately 300 to 400 miles in diameter and is generally measured as the shortest distance between two points where the antenna gain is minimally acceptable. For example, this may be a point at which the antenna gain drops off by 5 or 6 dB.

The coverage region 32 is shown utilizing what is known as a 4-to-1 reuse where the coverage region 32 is separated into one of four types of ground cells 34a–34d. Of course, any other type of reuse pattern may also be employed. Each of the ground cells 34 having the same shading operate within the same frequency band. Each frequency band, which is preferably about 125 MHz wide, is separated into preferably seven sub-bands (carrier frequency channels), each having a bandwidth of about 17.85 MHz. The sub-bands are available to users or terrestrial terminals 14 operating within the ground cells 34. For example, each of the ground cells 34a may be allocated a first 125 MHz frequency band that is divided into seven 17.8 MHz sub-bands where each sub-band may be divided into multiple channels of 1, 5 or 25 (modes X, Y, and Z). In this way, user terminal 14a within ground cell 34a may be allocated at least one of the channels within at least one of the sub-bands and at least one of the time slots allocated to that particular channel. Similarly, each of the ground cells 34b may be allocated a second 125 MHz frequency band, each of the ground cells 34c may be allocated a third 125 MHz frequency band and each of the ground cells 34d may be allocated a fourth 125 MHz frequency band. In other words, all of the ground cells identified as 34a will be operated within the same 125 MHz frequency band having the same channels available and so forth throughout each set of ground cells 34 within the coverage region 32.

User terminal 14a in ground cell 34a may be operating within one of the seven (7) sub-bands of the first 125 MHz frequency band and say, for example, channel one of a Y mode allocation. The communications uplink 16a originating from user terminal 14a is directed into a main beam 38 of the multibeam antenna 22 servicing ground cell 34a. User terminal 14a may also be bursting on and off within a particular time slot for carrier channel one within the sub-band. User terminal 14a may also use additional carrier channels within the sub-band and/or additional time slots depending on how much bandwidth the user terminal 14a requires to transmit all its data, via the communications uplink 16a.

Each of the communications downlinks (N) 18 from the communications satellite 12 to the multiple user terminal 14 within each group of ground cells 34a–34d operates on a single carrier frequency or channel and is generally always on. In other words, all of the ground cells 34a operate on a first carrier frequency, all of the ground cells 34b operate on a second carrier frequency and so forth. The reason for the single carrier frequency being used for each group of ground cells 34a–34d on the communications downlinks 18 is because of the limited power constraints associated with operating the processing communications satellite 12.

Figure 3:
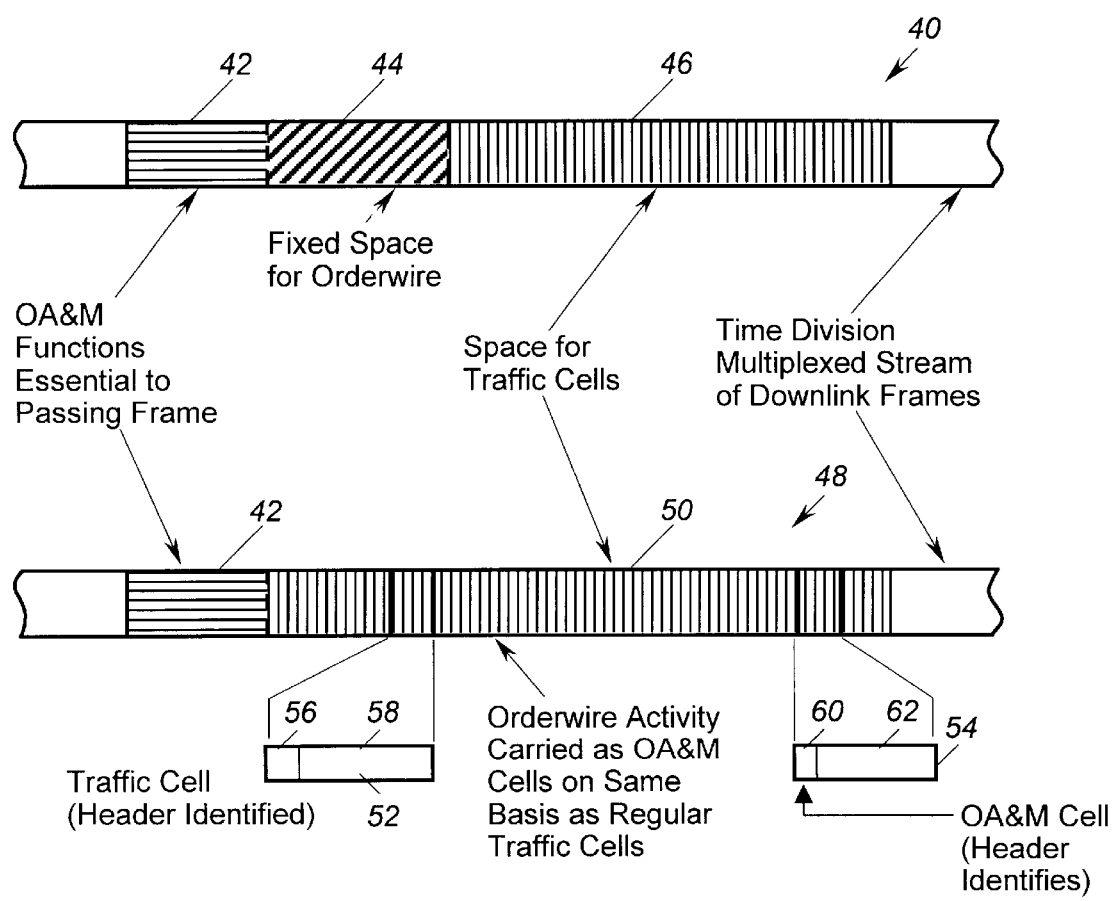
FIG. 3 is a diagram illustrating previous frame allocation and the preferred allocation according to the teachings of the present invention.

Turning to FIG. 3, a conventional downlink frame structure 40 and the preferred downlink frame structure 48 according to the teaching of the preferred embodiment of the present invention are shown in detail. In the convention frame allocation 40, the frame 40 is structured in three parts. The first part or portion 42 is structured to include essential control or OA&M functions, which are essential to transmitting the frame 40. This information relates directly to the control of the physical layer of the transport path of the downlink 18. Specifically, this includes any OA&M information that is necessary to control the frame 40 that bears multiple ATM cells, such as synchronization fields for delineation of the frame 40 and control directives which must be established in order to process the frame 40, such as the decoding technique or type. Additionally, this portion 42 also identifies the beginning of the frame 40, the length and the particular frame number. The second part or portion 44 is a fixed space allocated for other OA&M orderwire information. This information includes synchronization feedback, power requirements, assignment of time slots and channels, authorization codes, billing information, as well as other OA&M orderwire information known in the art. This fixed distinct portion 44 may take up a significant portion of the entire frame 40 which limits the overall bandwidth for transmission of the desired communication and information data. The third part or portion 46 is allocated for multiple ATM traffic cells that do contain the communication and information data desired to be transmitted over the satellite communications system 10.

The second frame structure 48 according to the teaching of the preferred embodiment of the present invention includes the first portion 42 as in the prior frame 40 which contains essential OA&M control functions to pass the frame 40 in the downlink 18. The improved frame structure 48 further includes a second portion 50 which essentially combines the earlier fixed part 44 carrying orderwire information with the fixed part 46 carrying data traffic cells. The second portion 50 includes multiple ATM cells, some of which are traffic cells 52 and some of which are OA&M cells 54. Each traffic cell 52 includes an individual header 56 and a body 58. The header 56 identifies the address of the particular user terminal 14 for which the information in the body 58 is directed to. Likewise, each OA&M cell 54 includes a header 60 and a body 62. Each header 60 also includes the address for the particular user terminal 14, as well as includes a priority designation which may place a higher or lower priority for the OA&M cell 54 relative to the traffic cell 52, further discussed herein. The traffic cell header 56 also includes a priority designation. The two headers are identical in structure. The body 62 carries the OA&M information required for the particular user terminal 14. By structuring the frame 48 in this manner, the fixed portion 44 is eliminated to allow various numbered OA&M cells 54 to be disbursed with the traffic cells 52 throughout the second portion 50 of the frame 48, enabling an efficient use of the overall bandwidth. In this regard, should there be a significant amount of OA&M information to be passed, many OA&M cells 54 may be allocated within the second portion 50. However, should there be a limited number of OA&M cells or none for a particular frame 48, this space which was previously reserved in a fixed allocation may now be used to carry additional traffic cells 52 in the downlink 18 from the processing satellite 12.

Figure 4:
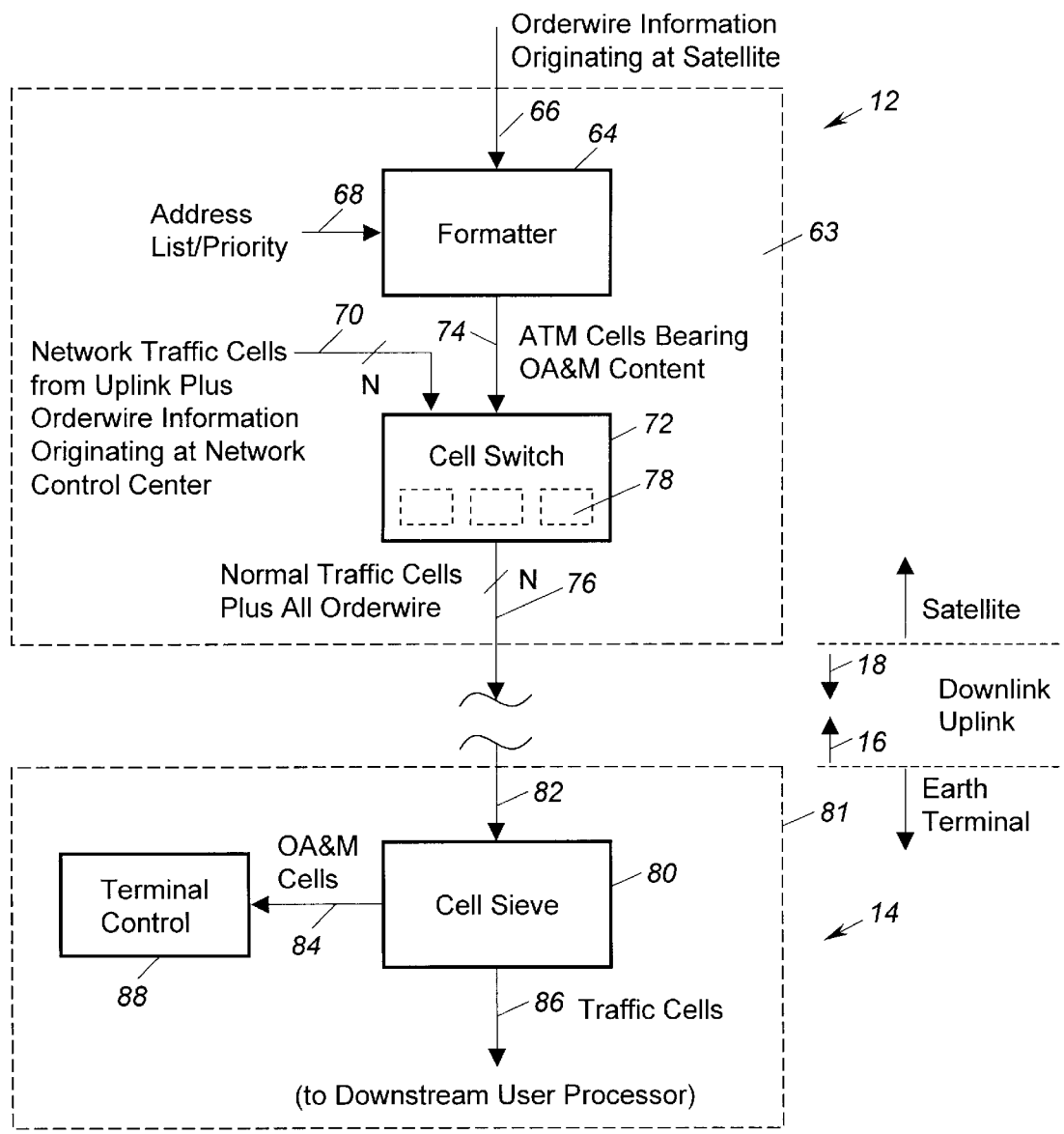
FIG. 4 is a block diagram illustrating a downlink orderwire integrator and separator for use in a processing satellite and a user terminal according to the teachings of the preferred embodiment of the present invention.

Referring now to FIG. 4, the processing satellite 12 and the user terminal 14 employing the preferred embodiment of the present invention is disclosed in further detail. Here again, the overall application of the present invention is the use of the universal all-purpose ATM cells for carrying OA&M traffic in the downlink 18 of the processing satellite 12, thereby eliminating the need for a fixed orderwire portion 44 in the frame 48 and greatly simplifying the process of identifying the control flow and separating this flow from the main flow of data traffic. While this method may be used with any fixed sized cell based protocol, it will be exemplarily described here in terms of the widely known ATM protocol. In particular, ATM cells of 53 bytes (5 of header and 48 of body) are used, on an as required basis to transport OA&M information, via the OA&M cells 54. The OA&M cells 54 may be addressed to all terminals collectively in the particular coverage area 32 or cell 34 (typically a spotbeam) in a broadcast mode. Alternatively, they may be addressed to a subset of terminals in a coverage region 32 or cell 34 in a multicast mode or to individual terminals in a unicast mode. The addressing for the ATM cells which is known in the art includes the provisions of explicit virtual connections (VCs) for Virtual channel identifier Virtual Channel identifier (VCIs and VPIs). Because of the inherent flexibility of the ATM protocol, these OA&M cells 54 may evolve over the life of the communication system 10 to incorporate unforeseen requirements or abandon particular OA&M functions that prove to be unnecessary, thereby providing further versatility in the system 10.

The orderwire activity flow is shown in detail in FIG. 4. In this regard, information that would be carried in a fixed orderwire portion in previous conventional frames 40, may originate within the processing satellite 12 or from the network control center 24. The information originating within the processing satellite 12 is routed to a downlink orderwire integrator 63 that includes a formatter 64, by way of input 66. The formatter 64 places the OA&M data into the body 62 of the OA&M cell 54 and inserts or appends an address (VPI/VCI) and priority into the header field 60 of the OA&M cell 54, via an address list/priority input 68 to vector the OA&M cell 54 to the appropriate set of user terminals 14.

For OA&M information originating at the network control center 24, a similar process occurs within the control processor 26 to form OA&M cells 54 that are carried in the uplink 16 to the processing satellite 12 which are indistinguishable at the processing satellite 12 from normal traffic cells 52. These OA&M cells 54, as well as traffic cells 52 on the various other uplinks 16 are received at input ports 70, where N equals one or more uplinks 16 supporting one or more cells 34. These inputs 70 are received at a cell switch 72 also located in the downlink orderwire integrator 63. The cell switch 72 thus receives both traffic cells 52 from user terminals 14 and OA&M cells 54 originating from the network control center 24, via uplinks 16.

The cell switch 72 directs cells (both traffic cells 52 and OA&M cells 54) to one or more downlinks 18 supporting the coverage area 32, as appropriate based upon the virtual circuit (VC) or user terminal 14 specified in the cell headers 56 and 60. The cell switch 72 combines the ATM cells for each particular downlink 18 by way of assembling the ATM cells in the multiple frames 48, via conventional frame formatters 78 incorporated within the cell switch 72. Each frame formatter 78 is dedicated to a particular downlink 18 and a particular output 76. In this way, the cell switch 72 routes the ATM cells to the correct downlink 18 and assembles the ATM cells in frames 48, prior to transmitting in the particular downlink 18, via the conventional frame formatters 78. Each frame formatter 78 appends or attaches the first control portion 42 of the frame 48 having the essential OA&M functions and assembles the traffic cells 52 and the OA&M cell 54 in the second traffic portion 50 for transport, via the downlink 18. Should a particular OA&M cell 54 have a higher priority identified in the header 60, the cell switch 72 will insure priority of packing the OA&M cell 54 into a frame 48 before lower priority traffic cells 52. Each output 76 is transmitted through a downlink 18, via the multibeam antenna 22, positioned on the processing satellite 12. It should further be noted that in some cases, an ATM cell may be replicated within the cell switch 72, as is known in the art to create multiple ATM cells when the address or virtual circuit (VC) includes multiple destination terminals 14 in multiple downlink beams 18 (i.e., multicast or broadcast VCs).

Each user terminal 14 positioned within the particular cell 34 of the coverage region 32 receives a downlink 18 for the cell 34. The user terminal 14 receives the entire frame 48 which includes the first portion 42 having the essential OA&M functions, such as synchronization, decoding type, frame number and length, as well as the second portion 50, including both traffic cells 52 and OA&M cells 54. A cell sieve or filter 80 positioned within a downlink orderwire separator 81 receives the frames 48, via input 82. The cell sieve 80 for the particular terminal 14 sieves or filters the composite stream of ATM cells to discard ATM cells with VCs (i.e., addresses) which do not include the receiving terminal 14. For ATM cells that are addressed to the user terminal 14 and retained, the cell sieve 80 separates the OA&M cells 54 from the traffic cells 52 with the OA&M cells 54 routed at output 84 and the traffic cells 52 routed at output 86. The OA&M cells 54 are passed to a terminal controller 88 where the orderwire body 62 of the OA&M cell 54 is extracted and acted upon. Likewise, the traffic cells 86 are passed downstream, via output 86, to an internal user processor in the user terminal 14 for dissemination of the communication and information data to the user.

By applying the present method and hardware disclosed herein, only the precise amount of downlink bandwidth needed to support OA&M is allocated from the downlink capacity. During periods of high volume OA&M activity, bandwidth may be made available on an as needed basis to support the OA&M traffic. (Unlike the traditional orderwire approach where the OA&M allowance is rigidly prescribed). This provides a very flexible dynamic method for changing OA&M requirements, which is also easier to assemble and produce OA&M traffic at the processing satellite 12 and easier to extract the OA&M traffic at the user terminal 14. Additionally, the OA&M traffic may be given varying levels of priority, via the header 60 to insure that important OA&M traffic is received promptly and acted upon at the user terminal 14. Finally, the OA&M traffic may also be directed to user terminals 14 via broadcast, multicast or unicast basis.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A downlink orderwire integrator for use in a processing satellite in a satellite based communications system, said downlink orderwire integrator comprising:
   a formatter operable to generate orderwire cells with each orderwire cell having a header and a body; and
   a cell switch operable to receive said orderwire cells from said formatter and traffic cells from at least one uplink, said cell switch further operable to arrange said orderwire cells and said traffic cells in at least one frame to transmit on at least one downlink, wherein said frame includes a fixed control frame portion and a traffic portion that contains both said traffic cells and said orderwire cells.

2. The downlink orderwire, integrator as defined in claim 1 wherein said header for each orderwire cell includes a user address and a priority code.

3. The downlink orderwire integrator as defined in claim 2 wherein each orderwire cell is formatted as an asynchronous transfer mode (ATM) cell.

4. The downlink orderwire integrator as defined in claim 1 wherein said cell switch is further operable to receive orderwire cells from a terrestrial based network control center.

5. The downlink orderwire integrator as defined in claim 1 wherein said cell switch includes at least one frame formatter operable to arrange said orderwire cells and said traffic cells in at least one frame.

6. The downlink orderwire integrator as defined in claim 5 wherein said frame formatter assembles a plurality of frames from said orderwire cells and said traffic cells with each frame having a varying number of orderwire cells and traffic cells.

7. The downlink orderwire integrator as defined in claim 5 wherein said cell switch includes multiple frame formatters corresponding to a number of downlinks from the processing satellite.

8. The downlink orderwire integrator as defined in claim 1 wherein said fixed control frame portion includes synchronization and decode information.

9. The downlink orderwire integrator as defined in claim 8 wherein said orderwire cell includes synchronization feedback information, power information, assigned time slot and channel information.

10. A downlink orderwire integrator and separator for use in a processing satellite and a user terminal in a satellite based communications system, said downlink orderwire integrator and separator comprising:
    a formatter operable to generate orderwire cells with each orderwire cell having a header and a body;
    a cell switch operable to receive said orderwire cells from said formatter and traffic cells from at least one uplink, said cell switch further operable to arrange said orderwire cells and said traffic cells in at least one frame to transmit on at least one downlink, said frame including a fixed control frame portion and a traffic portion that contains both said traffic cells and said orderwire cells; and
    a cell sieve operable to receive said at least one frame on said at least one downlink, said cell sieve further operable to separate said traffic cells and said orderwire cells from said traffic portion, wherein said formatter and said cell switch are positioned within the processing satellite and said cell sieve is positioned within the user terminal.

11. The downlink orderwire integrator and separator as defined in claim 10 wherein each orderwire cell is an asynchronous transfer mode (ATM) cell and each header in said orderwire cells includes a user address and priority code.

12. The downlink orderwire integrator and separator as defined in claim 10 wherein said cell switch is further operable to receive orderwire cells from a terrestrial based network control center.

13. The downlink orderwire integrator and separator as defined in claim 10 wherein said cell switch includes at least one frame formatter operable to arrange said orderwire cells and said traffic cells in at least one frame.

14. The downlink orderwire integrator and separator as defined in claim 13 wherein said cell switch includes multiple frame formatters corresponding to a number of downlinks from the processing satellite.

15. The downlink orderwire integrator and separator as defined in claim 10 wherein said fixed control frame portion includes synchronization and decode information and said orderwire cell includes synchronization feedback information, power information, assigned time slot and channel information.

16. The downlink orderwire integrator and separator as defined in claim 10 wherein said cell sieve is further operable to discard traffic cells and order wire cells not addressed to the user terminal.

17. The downlink orderwire integrator and separator as defined in claim 10 wherein said cell switch is further operable to arrange said orderwire cells and said traffic cells into a plurality of frames with each frame including a fixed traffic portion that contains a varying number of traffic cells and orderwire cells.

18. The downlink orderwire integrator and separator as defined in claim 10 wherein a number of orderwire cells in said traffic portion varies from frame to frame based upon need.

* * * * *